United States Patent [19]

Stover

[11] Patent Number: 4,493,249
[45] Date of Patent: Jan. 15, 1985

[54] APPARATUS FOR DISSOLVING SOLUBLE COFFEE

[75] Inventor: Kenneth W. Stover, Springfield, Ill.

[73] Assignee: Bunn-O-Matic Corporation, Springfield, Ill.

[21] Appl. No.: 440,979

[22] Filed: Nov. 12, 1982

[51] Int. Cl.³ .............................................. A47J 31/00
[52] U.S. Cl. .................................... 99/275; 222/129.2; 366/163; 366/165
[58] Field of Search ................ 99/275, 279, 300, 287; 366/165, 163, 184, 191; 141/67, 105; 222/133, 630, 637, 129.2; 426/433

[56] References Cited

U.S. PATENT DOCUMENTS

| | | | |
|---|---|---|---|
| 3,212,757 | 10/1965 | Martin | 366/165 |
| 3,641,918 | 2/1972 | Schellgell | 99/300 |
| 3,782,695 | 1/1974 | Sandiford | 366/163 |
| 3,995,838 | 12/1976 | Zucker | 366/165 |
| 4,390,284 | 6/1983 | Hyde | 366/165 |

FOREIGN PATENT DOCUMENTS 1369218  10/1974  United Kingdom ................ 366/165

Primary Examiner—Robert W. Jenkins
Attorney, Agent, or Firm—Lockwood, Alex, FitzGibbon & Cummings

[57] ABSTRACT

Apparatus and method for making large volumes of hot coffee wherein soluble coffee (i.e. freeze-dried or other instant coffee) is mixed with a relatively small stream of cool or cold water and the resulting mixture is sucked into a relatively large stream of hot water by jet action. The dry soluble coffee in the form of powder, crystals or flakes is metered by an auger from the bottom of a hopper through a discharge nozzle and falls into a mixing bowl wherein the cool or cold water is flowing in the form of a vortex. The cool or cold water spirals down the sides of the bowl in the form of a water curtain which wets and sweeps the interior surface of the mixing chamber thereby preventing buildup of soluble coffee solids thereon and inside the mixing chamber. The resulting mixture is sucked or drawn by jet action from the bottom of the mixing bowl into a conduit in which a stream of hot water is flowing in sufficient velocity and volume to create suction in a connection between the bottom of the bowl and the hot water conduit. The suction prevents steam or hot moisture from rising in the mixing bowl and reaching the dry instant coffee in the hopper or discharge nozzle. An easily detachable and replaceable nozzle cap for the projecting end of the auger facilitates quick and easy access to the auger and discharge nozzle, not only for periodic routine cleaning when the apparatus is empty but also when the apparatus has sat idle for several days in a humid atmosphere with soluble coffee solids in the hopper and discharge nozzle.

6 Claims, 4 Drawing Figures

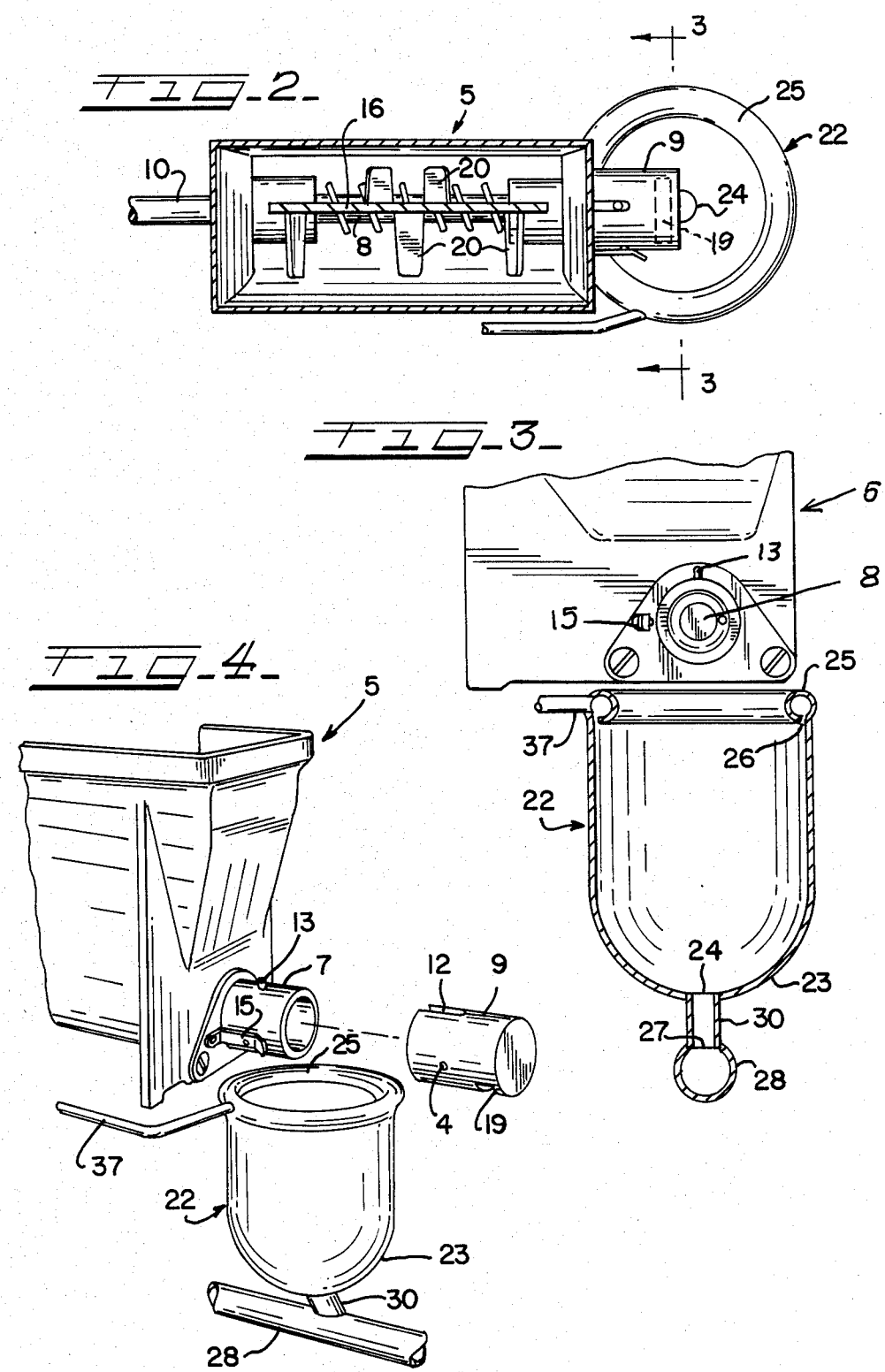

APPARATUS FOR DISSOLVING SOLUBLE COFFEE

This invention relates, generally, to a method and apparatus for making large quantities of hot coffee beverage from soluble coffee particles such as freeze-dried coffee, or other forms of soluble coffee commonly referred to as "instant coffee". Available forms of soluble coffee particles, which may be in the form of flakes, crystals or powder, are normally deliquesent or hygroscopic so as to have a marked tendency to become sticky or to cake either when exposed to moisture in the form of steam or water vapor, or when exposed to a humid atmosphere for several days.

While freshly brewed coffee prepared in batches from ground coffee is generally considered to be superior to hot coffee beverage prepared by mixing hot water with freeze-dried or other forms of instant coffee, there are occasions when it is advantageous to use soluble coffee instead of ground coffee. Typically, such occasions arise when there is a demand for a large volume of hot coffee and the time available for preparing the large volume is relatively short. Examples of such occasions are large banquets, large spectator events or other large gatherings.

Although batches of hot coffee beverage, on the order of a few gallons, can be manually prepared from freeze-dried coffee or other forms of soluble or instant coffee, the highly deliquesent or hygroscopic nature of available soluble coffee products creates problems and complications when large volumes of hot coffee beverage are required or when a continuous supply must be maintained for a long period. One of the problems is the need to be able to readily and conveniently clean the dispensing apparatus after it has sat idle for several days in a humid atmosphere.

Apparatus has been previously proposed for use in vending machines for mixing small quantities of instant coffee directly into hot water, as in U.S. Pat. Nos. 3,446,137; 3,446,399 and 4,018,366.

The object of this invention, generally stated, is the provision of convenient, practical and economical apparatus and method whereby large volumes of hot coffee beverage of uniform strength and temperature can be prepared from soluble coffee such as freeze-dried coffee.

An important object of the invention is the provision of apparatus and method for preparing large volumes of hot coffee beverage in short periods of time from soluble coffee, such as freeze-dried coffee, wherein the deliquesent or hygroscopic properties of the particles of soluble coffee are not allowed to interfere with the preparation process or operation of the apparatus.

A more specific object of the invention is the provision of a dispenser for discharging deliquesent or hygroscopic soluble coffee particles which includes an easily removable and replaceable cap for an auger discharge nozzle that permits easy and convenient cleaning.

Certain other objects of the invention will become apparent from the following detailed description thereof taken in connection with the accompanying drawings wherein:

FIG. 2 is an enlarged sectional view taken on line 2—2 of FIG. 1;

FIG. 3 is a sectional view taken on line 3—3 of FIG. 2;

FIG. 4 is a fragmentary perspective view taken from the right-hand side of the apparatus as viewed in FIG. 1, and showing the closure cap removed from the discharge spout.

Figure 1:
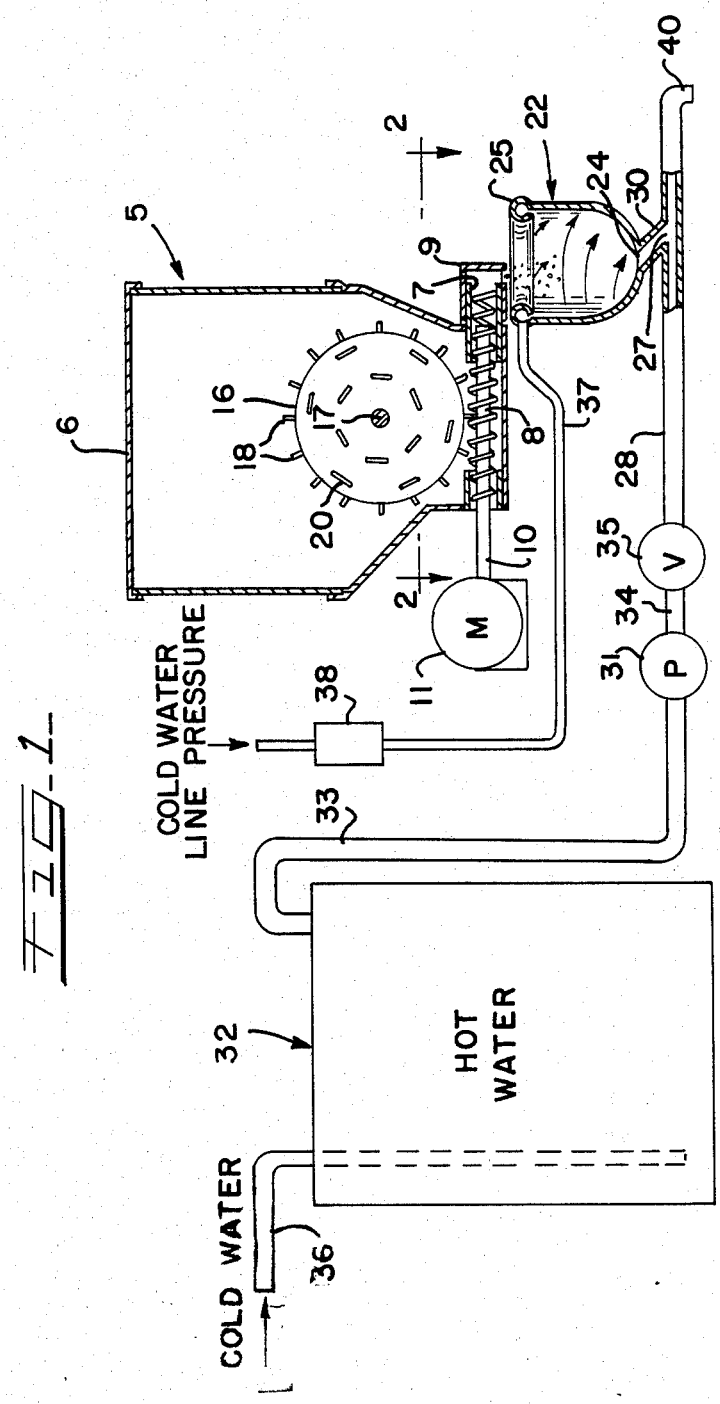
FIG. 1 shows, partly in vertical section and partly diagrammatically, one form of apparatus embodying the present invention.

Referring to the drawings, a hopper is indicated generally at 5 for containing a supply of soluble coffee particles (powder, crystals or flakes) such as freeze-dried coffee. The hopper 5 is provided with a removable cover 6 so that additional quantities of soluble coffee particles can be introduced from time to time as required. It has been found that a hopper having a capacity of 3 to 5 lbs. of soluble coffee particles is generally adequate.

The bottom of the hopper 5 is provided with a laterally extending discharge spout 7 (FIG. 4) in which the discharge end of an auger 8 rotates. The spout 7 is provided with a removable cap 9 (FIG. 4). Preferably the auger 8 is positioned a short distance above the bottom of the hopper 5 and extends rearwardly across the bottom from the spout 5 on the opposite side thereof from the spout 7. The drive shaft 10 is suitably coupled to an electric motor 11 of known type. The motor 11 may have a control of known type so that it either operates at one or more predetermined speeds or over a range of speeds. In practice, it has been found that one slow and one fast speed is satisfactory.

The removable cap 9 has an alignment or pilot slot 12 that slides over an alignment or pilot pin 13 that projects from the top of the nozzle 7. The cap 9 also has a retention dimple 4 that receives the retention detent 14 on a spring clip 15 anchored to the hopper 5. The underside of the cap 9 has a discharge window or opening 19 through which dry particles of soluble or instant coffee are discharged from the nozzle 7. The cap 9 is shown in place in FIG. 2 and removed in FIG. 4. Removal of cap 9 involves flexing the clip 15 so as to release the detent 14 from the dimple 4 and pulling outwardly on the cap. To replace the cap 9, it is placed over the end of the nozzle 7 with the slot 12 aligned with pin 13 and then pushed inwardly until the detent 14 seats in the dimple 4.

In order to prevent bridging of the soluble coffee powder in the hopper 5 and keep the auger 8 immersed in a bed of the instant coffee, an agitator wheel 16 is mounted in the hopper 5 for rotation on a shaft 17. The wheel 16 has radially projecting paddles or fins 18 extending from its periphery and laterally projecting paddles or fins 20 extending from one or both sides. The fins are engaged by the screw auger which acts as a worm to rotate the wheel 16 on its shaft 17.

The dispensing hopper 5 is of known commercial construction and operates in known manner except with respect to the nozzle 7 and the construction of the removable end cap 9. The novel construction of the closure cap 9 and nozzle 7 permits the operator to conveniently and quickly remove plugs or deposits of caked or coalesced instant coffee from the interior of the nozzle 7 and cap 9.

A mixing receptacle, indicated generally at 22, is located underneath the discharge spout or nozzle 7 so as to receive the stream of soluble coffee particles in dry form discharged from the spout 7 through the downwardly opening window (FIG. 4). The upper portion of the mixing vessel 22 is generally cylindrical in shape with a rounded or hemi-spherical bottom 23 having a central outlet opening 24 therein. At the top, the vessel 22 is provided with a downwardly and inwardly curled or rolled lip formation 25 into which cool or cold water is introduced in a generally tangential manner so as to impart a strong swirling action to the water as it discharges through the narrow annular opening 26 in the bottom of the torus 25. The cool or cold water then flows in the form of a vortex down the interior sidewalls of the receptacle 22 with the center of the vortex located approximately directly over the outlet opening 24. As the swirling curtain of cool or cold water flows around and down the interior surface of the receptacle 22, it cleanses the surfaces and prevents buildup or retention thereon of caked deposits or accumulations of soluble or instant coffee. The annular opening 16 is purposely restricted so that the cool or cold water discharges through a complete loop. A width of 0.03 inch for the opening 26 has been found satisfactory.

The outlet opening 24 is connected to an inlet opening 27 in a horizontal hot water conduit or tube 28 by an angle tube 30.

Hot water is caused to flow in a direction toward the right as viewed in FIG. 1 by means of a pump 31 of known type, the intake of which is connected to the top of a hot water heater or reservoir 32 by means of a connection 33 having its intake located beneath the normal water level. The discharge side of the pump 31 is connected by means of a coupling or connection 34 to the inlet of a flow regulating valve 35. The pump 31 and flow regulating valve 35 work in combination to cause hot water to flow as a stream through the pipe or tube 28 at such a predetermined velocity that it produces a jet effect in the angle tube 30 whereby a suction or negative pressure is applied to the contents of the vessel 22. This prevents steam or water vapor from the hot water flowing in tube 28 from rising in the vessel 22, escaping therefrom, and reaching the discharge spout 7 and the particles of soluble coffee therein.

The water in the hot water heater 32 can be heated by any suitable known heater means, preferably by a thermostatically controlled electrical heating element of known type. A 15-gallon, fast recovery, automatic electric water heater of known type has been found satisfactory as the water heater 32. Cold water may be introduced under line pressure into the hot water heater through a cold water line 36, the discharge of which is located adjacent the bottom of the heater. By means of this arrangement, as hot water is withdrawn through line 33, it is automatically replaced with an equal quantity of cold water with mixing minimized.

Cool or cold water is delivered to the cup-like mixing vessel 22 through a cold water line 37 connected with a cold water supply under line pressure. The conduit or line 37 is preferably provided with a flow regulating device 38 of known type which automatically regulates the volume and pressure of the cold water flowing through the line 37 and discharging into the vessel 22.

The outlet or discharge end of the hot water tube or conduit 28 is provided with a down-spout 40 which discharges into any conveniently sized container or vessel.

It will be understood that cold water is introduced into the vessel 22 at a predetermined volume while the auger 8 operates to discharge the granules or particles of dry soluble coffee at a predetermined rate.

In one working embodiment of the apparatus shown in FIG. 1 having low and high volume modes, hot coffee beverage can be produced at either the lower rate of 1½ gallons per minute or at the higher rate of 3½ gallons per minute. The mixing receptacle 22 has a capacity of approximately 12 ounces. In its lower volume setting, the pump 31 and flow control valve 35 cause hot water to flow through the pipe 28 at a rate of 1.32 gallons per minute and the flow regulating valve 38 allows cool or cold water to flow at the rate of 0.18 gallon per minute. The motor 11 rotates the auger 8 at a speed of 60 rpm so as to meter freeze-dried instant coffee into the receptacle 22. The water from the heater may have a temperature of 206° F.

In its higher volume setting or mode, the pump 31 and flow control valve 35 cause hot water to flow through the pipe 28 at a rate of 3.2 gallons per minute and a flow regulating valve 38 is used which allows cool or cold water to flow at the rate of 0.3 gallon per minute. The motor 11 rotates the auger 8 at a speed of 300 rpm so as to meter a larger volume of the coffee particles into the receptacle 22.

In this embodiment, the hot water conduit 28 had an inner diameter of 0.53 of an inch and the cool or cold water line 37 had an inner diameter of 0.094 of an inch.

It will be understood that in addition to those above-mentioned or suggested, various other changes or modifications can be made in the apparatus shown in and described in connection with FIGS. 1-4 without departing from the spirit and scope of the invention.

What is claimed as new is:

1. Apparatus for dissolving soluble coffee particles in hot water to produce hot coffee beverage comprising, feeding means for discharging a stream of soluble dry coffee particles at a predetermined rate, a mixing receptacle having a bottom discharge opening and wherein said stream of soluble coffee particles is received and mixed with a stream of cool or cold water, means for delivering a stream of cool or cold water to said receptacle at a predetermined rate, a hot water conduit, means for causing a stream of hot water to flow at a predetermined rate in said hot water conduit, and a conduit connection between said bottom discharge opening of said mixing receptacle and said hot water conduit, said mixing receptacle being positioned to receive said stream of soluble coffee particles and having water inlet means adjacent its top which causes the cool or cold water delivered thereto to flow as a vortex-like stream down the inner surface thereof while mixing with said soluble coffee particles, and said stream of hot water flowing in said hot water conduit being of such velocity and volume as to create suction in said conduit connection.

2. The apparatus of claim 1 wherein said feeding means for discharging a stream of soluble dry coffee particles at a predetermined rate comprises a hopper having a discharge nozzle, and said mixing vessel has a top opening juxtaposed beneath said discharge nozzle.

3. Apparatus for dissolving soluble coffee particles in hot water to produce hot coffee beverage comprising, feeding means for discharging a stream of soluble dry coffee particles at a predetermined rate, a mixing receptacle having a bottom discharge opening and wherein said stream of soluble coffee particles is received and mixed with a stream of cool or cold water, means for delivering a stream of cool or cold water to said receptacle at a predetermined rate, a hot water conduit, means for causing a stream of hot water to flow at a predetermined rate in said hot water conduit, and a conduit connection between said bottom discharge opening of said mixing receptacle and said hot water conduit, said mixing receptacle being positioned to receive said stream of soluble coffee particles and having water inlet means adjacent its top which causes the cool or cold water delivered thereto to flow as a vortex-like stream down the inner surface thereof while mixing with said soluble coffee particles, said stream of hot water flowing in said hot water conduit being of such velocity and volume as to create suction in said conduit connection and wherein said mixing receptacle is positioned a short distance above said hot water conduit and said conduit connection between said bottom discharge opening of said mixing receptacle and said hot water conduit is substantially smaller in cross-section than said hot water conduit and is connected to said hot water conduit at a location downstream from vertical alignment with said bottom discharge opening.

4. Apparatus for dissolving soluble coffee particles in hot water to produce hot coffee beverage comprising, feeding means for discharging a stream of soluble dry coffee particles at a predetermined rate, a mixing receptacle having a bottom discharge opening and wherein said stream of soluble coffee particles is received and mixed with a stream of cool or cold water, means for delivering a stream of cool or cold water to said receptacle at a predetermined rate, a hot water conduit, means for causing a stream of hot water to flow at a predetermined rate in said hot water conduit, and a conduit connection between said bottom discharge opening of said mixing receptacle and said hot water conduit, said mixing receptacle being positioned to receive said stream of soluble coffee particles and having water inlet means adjacent its top which causes the cool or cold water delivered thereto to flow as a vortex-like stream down the inner surface thereof while mixing with said soluble coffee particles, said stream of hot water flowing in said hot water conduit being of such velocity and volume as to create suction in said conduit connection and wherein said mixing receptacle is circular in shape with respect to its vertical axis and has a torus-shaped, inwardly overhanging hollow rim with a restricted annular opening in the bottom thereof, and wherein said means for delivering a stream of cool or cold water has a tangential connection with said rim.

5. The apparatus of claim 4 wherein said mixing vessel is cylindrical with a bowl-shaped bottom.

6. Apparatus for dissolving soluble coffee particles in hot water to produce hot coffee beverage comprising, feeding means for discharging a stream of soluble dry coffee particles at a predetermined rate, a mixing receptacle having a bottom discharge opening and wherein said stream of soluble coffee particles is received and mixed with a stream of cool or cold water, means for delivering a stream of cool or cold water to said receptacle at a predetermined rate, a hot water conduit, means for causing a stream of hot water to flow at a predetermined rate in said hot water conduit, and a conduit connection between said bottom discharge opening of said mixing receptacle and said hot water conduit, said mixing receptacle being positioned to receive said stream of soluble coffee particles and having water inlet means adjacent its top which causes the cool or cold water delivered thereto to flow as a vortex-like stream down the inner surface thereof while mixing with said soluble coffee particles, and said stream of hot water flowing in said hot water conduit being of such velocity and volume as to create suction in said conduit connection and, wherein said feeding means for discharging a stream of soluble dry coffee particles at a predetermined rate comprises a hopper having a horizontal discharge nozzle in which the end of a discharge auger disposed in the bottom of said hopper rotates, and a removable closure cap fits telescopically over said nozzle, said cap having a particle discharge opening in the underside, and said cap and nozzle having cooperating releasable cap retention means whereby said cap can be readily removed from said nozzle.

* * * * *